United States Patent [19]

Sielman et al.

[11] 4,218,772
[45] Aug. 19, 1980

[54] LOCKED-OSCILLATOR REPEATER WITH MODULATION FREQUENCY FEEDBACK

[75] Inventors: Peter F. Sielman, Huntington; Mario F. Strano, Franklin Square; Frank J. Tressa, Deer Park, all of N.Y.

[73] Assignee: The United States of America as represented by the Secretary of the Army, Washington, D.C.

[21] Appl. No.: 937,295

[22] Filed: Aug. 28, 1978

[51] Int. Cl.² .............................................. H04B 7/14
[52] U.S. Cl. .................................................... 455/20
[58] Field of Search ...................... 325/1, 7, 8, 9, 11, 325/12, 30; 343/6.8

[56] References Cited

U.S. PATENT DOCUMENTS

| | | | |
|---|---|---|---|
| 3,566,234 | 2/1971 | Thomson | 325/7 |
| 3,611,139 | 10/1971 | George | 325/9 |
| 3,636,453 | 1/1972 | George | 325/7 |
| 3,987,396 | 10/1976 | Kreger | 325/7 |

Primary Examiner—Benedict V. Safourek
Assistant Examiner—Michael A. Masinick
Attorney, Agent, or Firm—Nathan Edelberg; Michael Zelenka; Bernard Franz

[57] ABSTRACT

In accordance with this invention, a radio repeater of the injection locked oscillator type is provided with a feedback circuit for changing the free-running or rest frequency of the locked oscillator so that it follows the frequency deviations of the frequency modulation signal being repeated. This results in a higher gain for the repeater.

6 Claims, 1 Drawing Figure

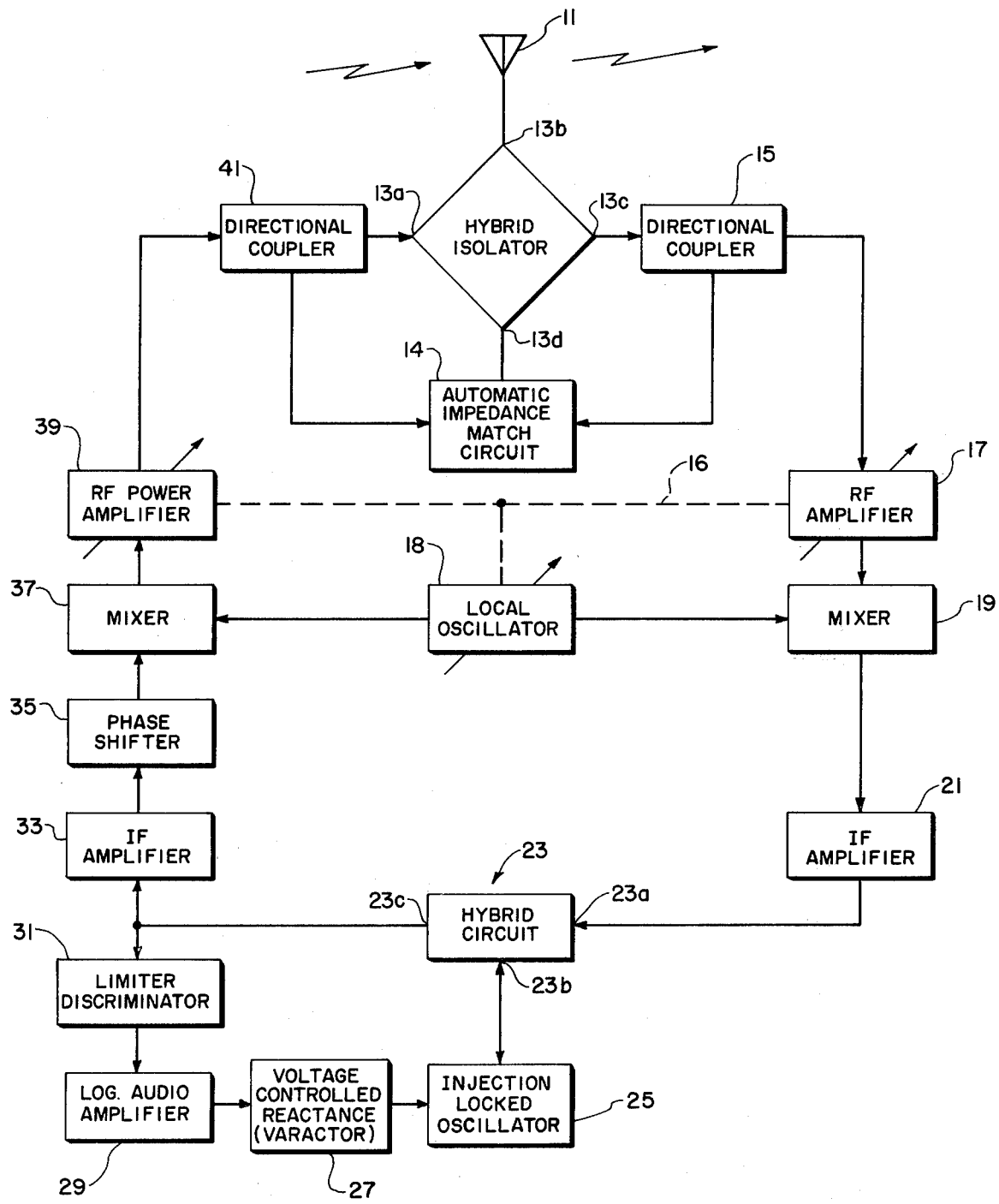

LOCKED-OSCILLATOR REPEATER WITH MODULATION FREQUENCY FEEDBACK

This invention may be practiced by or for the U.S. Government without the payment of any royalties.

BACKGROUND OF THE INVENTION

The operating capabilities of short range communication radio sets can be materially improved by use of repeaters. The effective range of radio sets is often reduced by natural obstacles such as dense foliage or hilly terrain. A strategically placed repeater may be used to overcome these natural obstacles by providing a transmission path free of obstructions, thereby extending the effective range of the radio set and improving its tactical value. For example, troops often set up radio sets in valleys or behind hills for protection and a hilltop repeater in such a situation can greatly expand the capability of such tactical radio sets.

Typically, repeaters operate either by receiving and retransmitting at the same frequency, repeaters of this type being known as F1-F1 repeaters, or by receiving at one frequency and, retransmitting at a second frequency, repeaters of this type being known as F1-F2 repeaters.

F1-F1 repeaters are more desirable in many applications since they utilize less hardware and require a smaller portion of the frequency spectrum. However, in these repeaters some means must be provided to prevent coupling between the transmitter and receiver, which can cause oscillation or singing.

The present invention is a repeater in which signal amplification is achieved by means of an injection locked oscillator. The incoming signal, which may be too noisy for direct amplification, is applied to an oscillator with a free-running frequency substantially equal to the center or carrier frequency of the incoming frequency modulated signal. The oscillator locks onto the injected signal and follows the modulation thereon. The oscillator output is then amplified and transmitted. The FIGURE of merit of such an injection locked oscillator is the locking gain, defined as the ratio of power output to power input. The locking gain is inversely proportional to the difference between the free-running or center frequency of the oscillator, and the instantaneous injection frequency. Thus, as the deviation of the received injected signal increases, the locking gain decreases. The present invention involves a means for permitting the free-running or center frequency of the oscillator to follow or track the frequency deviations of the injected signal, so that the average frequency deviation is greatly reduced and hence the locking gain stabilized and maximized.

SUMMARY OF THE INVENTION

This invention provides a means for continually changing the free-running frequency of an injection locked oscillator so that it follows the impressed modulation. This is done by means of a feedback system whereby a sample of the oscillator output is applied to a frequency discriminator which recovers the modulation of signal being retransmitted. This modulation is applied to a voltage controlled reactance in the oscillator tank circuit in such a manner as to pull the free-running oscillator frequency toward the instantaneous frequency thereof. By thus decreasing the difference between the free-running and instantaneous oscillator frequency, the gain is increased and stabilized as explained above.

BRIEF DESCRIPTION OF THE DRAWING

The sole FIGURE of the drawing is a block diagram of an F1-F1 radio repeater which incorporates an illustrative embodiment of the present invention.

DETAILED DESCRIPTION OF THE INVENTION

In the drawing the antenna 11 serves for both receiving and transmitting. The receiving channel comprises the blocks on the right side of the drawing and the transmitting channel those on the left. The Hybrid Isolator 13 and its associated Automatic Impedance Matching Circuit 14 serve to prevent the transmitted signal applied to the antenna 11 via hybrid port 13a from entering the receiving channel connected to hybrid port 13c, and also directs the received signal from antenna 11 to the receiving channel. The operation of this automatic impedance matching arrangement and the hybrid isolator is explained in detail in U.S. Pat. No. 4,028,645 and per se forms no part of the present invention.

The received signal, after passing through Directional Coupler 15 is applied to tunable RF Amplifier 17 which is gang-tuned with RF Power Amplifier 39 in the transmitter channel and also with Local Oscillator 18, as indicated by the dashed line 16 connecting these three circuit elements. The amplified received signal is applied to Receiver Mixer 19 together with the output of the Local Oscillator which differs from the tuning of both RF stages by the intermediate frequency. The IF Amplifier 21 selects the intermediate frequency from the mixer output and applies it to input port 23a of Hybrid Circuit 23. The Injection Locked Oscillator 25 is connected to port 23b of Hybrid 23. A voltage controlled reactance which may be a Varactor Diode 27, comprises part of the tank circuit of Oscillator 25. The output of the oscillator emerges from port 23c of Hybrid 23 and is applied to IF Amplifier 33 of the transmitter channel with a small portion thereof applied to Limiter-Discriminator 31. The Logarithmic Audio Amplifier 29 receives the discriminator output. The log amplifier output is applied to Varactor 27 to control the capacitance thereof. After passing through Phase Shifter 35 the transmitted signal is heterodyned up in frequency in Mixer 37 to equal that of the received frequency. Tunable RF Power Amplifier 39 then further amplifies the signal before it is applied to the antenna 11.

The function of Hybrid Circuit 23 is to isolate the receiving and transmitting channels by applying the output of the receiver IF Amplifier 21 to Oscillator 25 while directing most of the oscillator output to the transmitter channel. This may be accomplished for example if the port 23a of hybrid 23 is the anti-symetric port thereof, with port 23c being the symetric port and the oscillator port 23b being one of the hybrid collinear ports. This arrangement would anticipate the use of a standard four port hybrid, that is, a magic tee. The fourth port, that is the hybrid collinear port not coupled to the oscillator, would be terminated in a load in this instance and is not shown in the FIGURE. It would also be desirable to insert a 3 db. or 10 db. pad between IF amplifier 21 and Hybrid Circuit 23 to reduce any signals feeding back into the IF amplifier in this configuration.

A more desirable configuration would utilize a standard three port circulator as shown in the FIGURE. This device provides the characteristics described above, specifically, isolation of the receiving and transmitting channels by applying the output of the receiver IF amplifier 21 to oscillator 25 while directing most of the oscillator output to the transmitting channel. Merrimac Industries Inc. of West Caldwell, N.J. fabricates several such circulators for IF frequencies in order of 50 to 1000 MHz, such devices being well within the state of the art.

The limiter-discriminator is a conventional circuit element found in most frequency modulation receivers. The limiter removes any amplitude modulation on the signal and thus puts out a constant-amplitude signal. The discriminator has a center-frequency equal to the free-running frequency of Oscillator 25, this being its frequency in the absence of an input signal. The discriminator output is the frequency modulation on the signal being repeated. This modulation is amplified in Logarithmic Audio Amplifier 29 and then applied to Varactor 27, which is arranged to pull or modulate the free-running oscillator frequency so that it tends to follow the instantaneous frequency deviations caused by the injected signal frequency. As stated above, this arrangement results in higher repeater gain than would be otherwise attainable. The feedback loop comprising the Hybrid Circuit 23, Limiter-Discriminator 31, Log Amplifier 29 and Varactor 27 must be designed with substantially zero phase delay or shift in order to achieve the desired result. Since the varactor capacitance varies approximately inversely with the voltage applied thereto and since the oscillator frequency varies inversely with the square root of capacitance, it is necessary to distort the discriminator output in a logarithmic fashion in order for the oscillator frequency to track or follow the detected frequency modulation at the discriminator output. The required distortion or shaping is produced by the logarithmic amplifier.

While the invention has been illustrated in connection with an F1-F1 repeater, it is applicable to any type of injection locked oscillator type of repeater. Accordingly, the invention should be limited only by the scope of the appended claims.

What is claimed is:

1. A radio frequency repeater comprising receiving means for receiving an incoming signal;
   frequency reduction means, electrically in series with said receiving means, for reducing the frequency of a received incoming signal;
   a free running injection locked oscillator into which said reduced frequency incoming signal is injected, said oscillator producing an output signal and having a tank circuit containing a voltage controlled reactance which determines the frequency of said injection locked oscillator;
   sampling means, electrically coupled to the said injection locked oscillator, for sampling the output signal of said oscillator;
   processor means, electrically coupled to said sampling means, for converting the sampled oscillator output to a control voltage, the magnitude of said control voltage being dependent upon the frequency of the sampled oscillator output, and applying said control voltage to the voltage controlled reactance in the tank circuit of the injection locked oscillator thereby causing the free running frequency of said oscillator to follow the frequency of the incoming signal; frequency increasing means, electrically coupled to the output of said injection locked oscillator, for increasing the frequency of the injection locked oscillator output to a desired transmission frequency;
   transmitting means, electrically coupled to the output of said frequency increasing means, for transmitting an outgoing signal; and
   isolation and coupling means for coupling the reduced frequency incoming signal to the injection locked oscillator and for coupling the output signal from the injection locked oscillator to the processor means and frequency increasing means.

2. The radio frequency repeater of claim 1 wherein said voltage controlled reactance comprises a varactor diode.

3. The radio frequency repeater of claim 1 wherein said processor means includes a log audio amplifier and a varactor diode.

4. The radio frequency repeater of claim 1 wherein said isolation and coupling means comprises a three port circulator.

5. The radio frequency repeater of claim 1 wherein a plurality of amplifier means are included for amplifying the received incoming signal, the reduced frequency incoming signal, the oscillator output signal and the outgoing signal.

6. The radio frequency repeater of claim 5 including phase shifting means in electrical series with the output of the amplifier means which amplifies the oscillator output signal.

* * * * *